United States Patent [19]

Chang et al.

[11] 3,919,154

[45] Nov. 11, 1975

[54] AQUEOUS COATING COMPOSITION OF ACRYLIC POLYMER LATEX, ACRYLIC POLYMER SOLUTION AND AMINOPLAST AND METHOD OF MAKING

[75] Inventors: Yun-Feng Chang, Plymouth; Mo-Fung Cheung, Warren; Santokh S. Labana, Dearborn Heights, all of Mich.

[73] Assignee: Ford Motor Company, Dearborn, Mich.

[22] Filed: June 3, 1974

[21] Appl. No.: 476,114

[52] U.S. Cl....... 260/29.4 UA; 260/80.75; 260/80.8; 260/851; 260/856
[51] Int. Cl.²............... C08L 29/02; C08L 33/02; C08L 61/24; C08L 61/28
[58] Field of Search............ 260/29.4 UA, 851, 856

[56] References Cited
UNITED STATES PATENTS

| | | | |
|---|---|---|---|
| 3,107,227 | 10/1963 | Sven et al. | 260/856 |
| 3,218,280 | 11/1965 | Koral et al. | 260/856 |
| 3,245,932 | 4/1966 | Glavis et al. | 260/851 |
| 3,821,145 | 6/1974 | Walus | 260/851 |

FOREIGN PATENTS OR APPLICATIONS

| | | | |
|---|---|---|---|
| 676,155 | 12/1963 | Canada | 260/29.4 UA |

*Primary Examiner*—Murray Tillman
*Assistant Examiner*—Arthur H. Koeckert
*Attorney, Agent, or Firm*—Olin B. Johnson; Keith L. Zerschling

[57] ABSTRACT

Water-based paints having improved properties and application characteristics are disclosed. The paint, exclusive of optional components such as pigments, particulate fillers and catalysts, comprises a liquid, continuous aqueous phase. About 30 to about 50 percent by weight of this phase exclusive of the aforecited optional components, is made up of a mixture of (a) an amino resin crosslinking agent; (b) a mixture of at least two copolymers of acrylic monomers; and (c) an amine. The balance is water or, in certain embodiments, water and an organic solvent. The mixture of copolymers comprises (1) about 5 to about 50, preferably about 10 to about 30, parts by weight of a "solution polymer," i.e., a carboxyfunctional copolymer of acrylic monomers that (i) is at least partially neutralized with an amine, (ii) is soluble in said aqueous phase, (iii) has average molecular weight ($\overline{M}_n$) in the range of about 3,000 to about 20,000, and (iv) has Tg in the range of −15° to 50°C., and (2) about 50 to about 95, preferably about 70 to about 90, parts by weight of an "emulsion polymer," i.e., a copolymer of acrylic monomers having carboxy, hydroxy or carboxy and hydroxy functionality that (i) is essentially insoluble in said continuous phase, (ii) has average molecular weight ($\overline{M}_n$) in the range of about 3,000 to about 20,000, and (iii) has Tg of −15° to 50°C. The amino resin crosslinking agent is present in an amount in the range of about 15 to about 35 weight percent of the sum of the weight of solution polymer and the weight of emulsion polymer. The amine is a water-soluble amine and is present in an amount sufficient to solubilize the solution polymer in the aqueous phase at a pH range of about 7 to about 10, most commonly in the range of about 7.1 to about 8.5.

13 Claims, No Drawings

AQUEOUS COATING COMPOSITION OF ACRYLIC POLYMER LATEX, ACRYLIC POLYMER SOLUTION AND AMINOPLAST AND METHOD OF MAKING

BACKGROUND OF THE INVENTION

Water-based paints of the prior art have included "solution paints" and "emulsion (or latex) paints" with distinction being made with reference to the manner in which the sole or principal binder polymer is dispersed within the aqueous medium.

In those paints wherein the sole or principal binder polymer is soluble in the aqueous medium, the polymer is ordinarily of low molecular weight. These paints can be formulated to provide coatings of very high gloss. They tend to be slow drying and prone to sagging during application and to solvent popping during baking under high humidity conditions. Application solids are much lower than comparable latex paints.

The emulsion or latex paints have employed as their sole or principal binder polymer a polymer of very high molecular weight, i.e., in the range of about 100,000 to about 1,000,000 or higher. Such paints have been characterized by rapid drying and comparatively low gloss relative to paints based on water-soluble polymers.

Water-soluble polymers of high molecular weight have been added to latex paints as thickeners. Characteristically, such thickener polymers are used in very small amounts, e.g., of the order of one percent.

THE INVENTION

It has been discovered that water-based paints having a superior combination of physical properties and application characteristics can be obtained by using certain novel combinations of solution polymers and emulsion polymers. The coatings obtained from these hybrid compositions exhibit high gloss and generally excellent appearance.

The hybrid, water-based, paint compositions of this invention employ in combination a low molecular weight emulsion polymer and a low molecular weight solution polymer with the latter being present in an amount sufficient to contribute significantly to the composition of the polymeric binder, i.e., at least about 5 weight percent of this polymeric combination. Thus, they differ from the conventional emulsion type paints employing a water-soluble thickener polymer in at least three compositional respects irrespective of chemical functionality, namely, (1) the emulsion polymers of the instant paints have significantly lower molecular weights, (2) the solution polymers of the instant paints have significantly lower molecular weights, and (3) the solution polymers of the instant paints are employed in significantly higher concentrations than are the water-soluble thickener polymers.

More specifically, the hybrid paint compositions of this invention, exclusive of optional components such as pigments, particulate fillers and catalysts, have a liquid continuous aqueous phase. About 30 to about 50 percent by weight of this phase, exclusive of the aforecited optional components, is made up of a mixture of (a) an amino resin crosslinking agent; (b) a mixture of at least two copolymers of acrylic monomers; and (c) an amine. The balance is water or, in certain embodiments, water and an organic solvent. The mixture of copolymers comprises (1) about 5 to about 50, preferably about 10 to about 30, parts by weight of a "solution polymer," i.e., a carboxy-functional copolymer of acrylic monomers that (i) is at least partially neutralized with an amine, (ii) is soluble in said aqueous phase, (iii) has average molecular weight ($M_n$) in the range of about 3,000 to about 20,000, and (iv) has Tg in the range of −15° to 50°C., and (2) about 50 to about 95, preferably about 60 to about 90, parts by weight of an "emulsion polymer," i.e., a copolymer of acrylic monomers having carboxy, hydroxy or carboxy and hydroxy functionality that (i) is essentially insoluble in said continuous phase, (ii) has average molecular weight ($\overline{M}_n$) in the range of about 3,000 to about 20,000 and (iii) has Tg of −15° to 50°C. The amino resin crosslinking agent is present in an amount in the range of about 15 to about 35 weight percent of the sum of the weight of solution polymer and the weight of emulsion polymer. The amine is a water-soluble amine and is present in an amount sufficient to solubilize the solution polymer in the aqueous phase at a pH range of about 7.1 to about 8.5. In certain embodiments, hereinafter illustrated, these hybrid compositions include organic cosolvents while in other embodiments such solvents are not present.

When applied to the substrate to be coated by spraying, these water-based paints including pigments, particulate fillers, and catalysts, if any, contain between about 50 and about 65 percent by weight water or in those embodiments wherein such solvents are used, water and organic cosolvents.

PAINT PREPARATION

A number of methods can be used to prepare the water-based paints of this invention.

In a first general method, at least one of the polymers, usually the solution polymer, is polymerized in solution in a water miscible or dilutable organic solvent while the other polymer, usually the emulsion polymer, is prepared by an emulsion polymerization in water. The resultant water-based paint will contain a conventional, essentially non-reactive, water-miscible or dilutable organic paint solvent. The concentration of organic solvent in such paints will be at least about 5 percent by volume of the volatile phase, i.e., organic solvent and water, and preferably in the range of about 10 to about 20 volume percent of the volatile phase.

In a second general method both the solution polymer and the emulsion polymer are prepared by emulsion polymerization in water. The paints thus prepared are prepared without organic solvents and thus employed free of same. Organic solvents in the amounts used in the first general method may be added to the dispersion, if desired.

A third general method is the same as the first general method except for the difference that in carrying out the emulsion polymerization the surfactant, i.e., surface active agent or emulsifier, is replaced by a solution polymer hereinafter more fully described.

A fourth general method is the same as the second general method except for the difference that in carrying out one or both, preferably both, of the emulsion polymerizations the surfactant is replaced by a solution polymer hereinafter more fully described.

The advantage provided by the third and fourth general methods is that elimination of the conventional surfactant eliminates the problem of incompatibility and water sensitivity associated with the use of surfactants.

POLYMER COMPOSITION IN DETAIL

A. The solution polymer in these paints has carboxy functionality and may also have hydroxy functionality and/or amide functionality. These polymers contain about 5 to about 30 mole percent of acrylic or methacrylic acid and 70 to 95 mole percent of olefinically unsaturated monomers copolymerizable with such acid component. Preferably, these other olefinically unsaturated monomers are monoacrylates or monomethacrylates. In the embodiment wherein the primary solution polymer has only carboxy functionality, these are preferably esters of acrylic acid or methacrylic acid and a $C_1 - C_8$ monohydric alcohol. $C_8 - C_{12}$ monovinyl hydrocarbons such as styrene, alpha methyl styrene, t-butyl styrene, and vinyl toluene may comprise up to about 30 mole percent of such polymer. Vinyl monomers such as vinyl chloride, acrylonitrile, methacrylonitrile and vinyl acetate may be included in the copolymer as modifying monomers. However, when employed, these modifying monomers should constitute only between about 0 and about 30, preferably 0 to about 15, mole percent of such polymer. In the embodiment wherein the solution polymer has both carboxy functionality and hydroxy functionality, the copolymer contains about 5 to about 25 mole percent of acrylic of methacrylic acid, about 5 to about 25 mole percent of a hydroxyalkylacrylate or methacrylate, e.g., hydroxyethyl acrylate, hydroxypropyl acrylate, hydroxyethyl methacrylate or hydroxypropyl methacrylate, and a remainder of the same monofunctional monomers as set forth above for the solely carboxy-functional polymer. In still another embodiment, the polymer has amide functionality in addition to carboxy functionality. Such a polymer contains about 5 to about 25 mole percent acrylic acid or methacrylic acid, about 5 to about 25 mole percent of acrylamide, methacrylamide, N-methylolacrylamide, N-methylolmethacrylamide, or the alkyl ether of a methylolacrylamide or a methylolmethacrylamide, e.g., N-isobutoxymethylolacrylamide, with the remainder of the same monofunctional monomers as set forth above for the solely carboxy-functional polymer. A portion of the amide functional monomer may be replaced with an equimolar amount of one of the aforementioned hydroxyacrylates or hydroxymethacrylates.

Other monomers not heretofore mentioned may be used in these polymers if used in limited concentrations. These include 2-acrylamido-2-methylpropanesulfonic acid and methacryloyloxyethylphosphate, which may comprise up to about 3 percent of such polymer.

B. The emulsion polymer in these paints has carboxy functionality, hydroxy functionality or carboxy and hydroxy functionality. These polymers contain 0 to 15 mole percent acrylic acid or methacrylic acid, preferably 0 to 10 mole percent, and 85 to 100 mole percent of other olefinically unsaturated monomers that are copolymerizable with each other and with the acid component when the latter is used. Such other olefinically unsaturated monomers are the same in type and of the same percentage distribution range as those heretofore disclosed for the solution polymer with the exception of the acid monomer content above noted.

In those embodiments, wherein both the solution polymer and the emulsion polymer have hydroxy functionality and carboxy functionality, it is preferred to have a greater concentration of carboxy functionality on the solution polymer relative to the emulsion polymer and a greater concentration of the hydroxy functionality on the emulsion polymer relative to the solution polymer.

Thus, the combinations involved include (a) a carboxy-functional solution polymer and a hydroxy-functional emulsion polymer, (b) a carboxy-functional solution polymer and a carboxy-functional emulsion polymer, (c) a carboxy-functional solution polymer and a carboxy-functional, hydroxy-functional emulsion polymer, (d) a carboxy-functional and hydroxy-functional solution polymer and a hydroxy-functional emulsion polymer, (e) a carboxy-functional, hydroxy-functional solution polymer and a carboxy-functional and hydroxy-functional emulsion polymer, (f) a carboxy-functional and amide-functional solution polymer and a hydroxy-functional emulsion polymer, (g) a carboxy-functional and amide-functional solution polymer and a carboxy-functional emulsion polymer, (h) a carboxy-functional and amide-functional solution polymer and a carboxy-functional and hydroxy-functional emulsion polymer, (i) a carboxy-functional, hydroxy-functional, and amide-functional solution polymer and a hydroxy-functional emulsion polymer, (j) a carboxy-functional, hydroxy-functional, amide-functional solution polymer and a carboxy-functional emulsion polymer, and (k) a carboxy-functional, hydroxy-functional, amide-functional solution polymer and a carboxy-functional, hydroxy-functional emulsion polymer. Amide functionality may also be incorporated into the emulsion polymer but this is more difficult to achieve efficiently that in the solution polymer, particularly in the case of modified amide functionality, e.g., N-methylolacrylamide.

C. The amino resin crosslinking agent, may be and is hereafter illustrated as a conventional amino resin crosslinking agent of the type long in use as a crosslinking agent of the type long in use as a crosslinking agent in acrylic enamels, e.g., melamine-formaldehyde resins and urea-formaldehyde resins.

DETAILED DESCRIPTION OF FIRST GENERAL METHOD FOR PREPARING PAINTS DESCRIBED HEREIN a. Preparation of Solution Copolymer

In preparing the water-soluble copolymer, the functional monomers and the remaining monoethylenically unsaturated monomers are mixed and reacted by conventional free radical initiated polymerization in such proportions as to obtain the copolymer desired. A large number of free radical initiators are known to the art and are suitable for this purpose. These include benzoyl peroxide; t-butyl peroctoate; t-butyl perbenzoate; lauryl peroxide; t-butyl-hydroxy peroxide; acetylcyclohexane sulfonyl peroxide; diisobutyryl peroxide; di-(2-ethylhexyl) peroxydicarbonate; diisopropyl peroxydicarbonate; t-butylperoxypivalate; decanoyl peroxide; azobis (2-methyl propionitrile); etc. The polymerization is carried out in solution using a solvent which is miscible or dilutable with water. The solvent concentration at this stage is ordinarily about 30 to 60 weight percent of the polymerization solution. The polymerization is carried out at a temperature between about 45°C. and the reflux temperature of the reaction mixture. Included among the suitable solvents are n-propyl alcohol, isopropyl alcohol, dioxane, ethylene glycol monomethyl ether, ethylene glycol monoethyl ether, ethylene glycol monobutyl ether, diethylene glycol monobutyl ether, diethylene glycol monomethyl ether acetate, diethylene glycol monoethyl ether, diethylene glycol monobutyl ether, ethylene glycol monomethyl ether acetate, diethylene glycol monoethyl ether acetate, etc. The copolymer thus obtained is neutralized with amine to a pH of about 6 to 10 and diluted to desired viscosity with water or organic solvent.

b. Preparation of Emulsion Copolymer

In preparing the emulsion copolymer, the functional monomers are mixed and reacted by conventional freeradical initiated polymerization in aqueous emulsion to obtain the copolymer desired.

Coventional surfactants, chain transfer agents, and initiators are employed in the emulsion polymerization. The monomer charge is usually emulsified by one or more micelleforming compounds composed of a hydrophobic part, such as a hydrocarbon group containing six or more carbon atoms, and a hydrophilic part, such as hydroxyl groups, alkali metal, ammonium carboxylate groups, sulfonate groups, phosphate or sulfate partial ester groups, or a polyether chain. Exemplary emulsifying agents include alkali metal sulfonates of styrene, naphthalene, decyl benzene, and dodecyl benzene; sodium dodecyl sulfate; sodium stearate; sodium oleate; the sodium alkyl aryl polyether sulfates and phosphates; the ethylene oxide condensates of long chain fatty acids, alcohols, and mercaptans, and the alkali metal salts of rosin acids. These materials and the techniques of their employment in emulsion formation and maintenance are well known in the art. A chain transfer agent or mixture of chain transfer agents may be added to the reaction medium to limit the molecular weight of the copolymer; such chain transfer agents are generally mercaptans such as dodecanethiol, benzenethiol, 1-octanethiol, pentanethiol, and butanethiol. These are conventional materials and are employed in a conventional manner. The polymerization initiator is composed of one or more water-soluble, free-radical-generating species such as hydrogen peroxide or the sodium, potassium, or ammonium persulfates, perborates, peracetates, percarbonates and the like. The polymerization is carried out at a temperature between about 45°C. and the reflux temperature of the reaction mixture. As is well known is the art, these initiators may be associated with activating systems such as redox systems which may incorporate mild reducing agents, such as sulfites and thiosulfites, and redox reaction promoters such as transistion metal ions, and that these allow the polymerization to be carried out at a lower temperature, e.g., 0°C. or below. As, however, it is desirable to maintain a low concentration of non-polymeric ionic species in the finished paint formulation in order that the cured paint film may have optimum resistance to water, it is preferred to use a minimum concentration of such optional inorganic salts as ferrous sulfate, sodium bisulfite, and the like.

Those skilled in the art will be aware that other emulsifying agents, polymerization initiators and chain transfer agents may be used which are compatible with the polymerization system herein required and with the attainment of acceptable cured paint film properties.

As will be disclosed later herein, the solution polymer may also be prepared by emulsion polymerization. In such preparation, the resultant acid-functional copolymer latex is converted to a polymer solution by the addition of an appropriate base, usually ammonia or an organic amine. There are, however, different needs involved in the after-preparation employment of the emulsion polymer that is used as such in formulation of paint and the solution polymer which although prepared by emulsion polymerization is subsequently converted to a solution polymer and used as such. These needs should be taken into consideration in the preparation procedure.

In the use of emulsion polymerization to produce a solution polymer, there is no need for the resulting latex to be stable under conditions different from those ensuing at the end of the polymerization process since the latex no longer exists, as such, after the polymer goes into solution upon neutralization. To facilitate such conversion to solution polymers, polymers prepared by emulsion polymerization for use as solution polymers ordinarily contain a higher concentration of carboxyl groups and a lower concentration of decidedly hydrophobic monomers, e.g., 2-ethylhexyl acrylate, relative to the corresponding concentrations in the polymers prepared by emulsion polymerization for use as such.

In contrast, latices which are used as such in the formulation of paint are required to remain essentially as stable latices throughout the processes of polymerization, paint formulation, and product distribution and use. This implies a requirement of stability, i.e., freedom from coagulum formation through time and under a variety of pH conditions, solvent environment, etc. These requirements are best met, and hence it is preferred to use, an alkali metal or ammonium persulfate either as the sole polymerization initiator, or as one constituent of a mixed initiator system. In those embodiments in which conventional surfactants are used, it is preferred to use a plurality of surfactants, more specifically a combination of anionic and nonionic surfactants, to obtain a more stable latex. Such surfactant mixtures are well known in the art.

c. Formulation of Paint

The polymer solution and the polymer latex prepared according to the aforedescribed procedures are subsequently converted into a paint using conventional paint formulation techniques. Typically, a mill base is prepared which comprises the bulk of the pigment and/or particulate filler of the paint formulation. The mill base is "let down" i.e., blended with the remainding polymeric and liquid constituents of the final formulation. A mill base, prepared by conventional sand grinding, ball milling, or pebble milling generally comprises all or a part of the water soluble resin, pigments, organic cosolvents, and may also comprise a quantity of amine in excess of that required to solubilize the solution polymer. To complete the paint, the polymer latex which has been neutralized to a pH range of 5.0 to 10, preferably 5 to 9, is added with mild agitation to the balance of the water required in the total formulation. The balance of the water-soluble resin, crosslinking agent, and millbase are added slowly with agitation. Additional quantities of pigment may be added subsequently as slurries in organic solvents or as separate mill bases to adjust the color as desired. The viscosity of the finished paint is determined and adjusted as required to obtain desired application properties.

Alternately, all or a portion of the (preferably neutralized) polymer latex, water, organic cosolvent, and amine may be added to the solution polymer and pigments prior to ball milling, sand grinding, or pebble milling. This procedure is advantageously employed to reduce the viscosity of mill bases prepared using the solution polymers of relatively high molecular weight.

d. Use of Organic amines

Organic amines are used to neutralize carboxyl groups on the solution polymer and hence to render it soluble in the aqueous dispersion. They are also used to maintain the pH of the finished paint formulation above about 7, e.g., in the range of 7 – 10, preferably between 7 and 9.5, and with certain pigments such as aluminum flakes preferably between 7 and 9, to prevent premature reaction of the functional groups on the acrylic copolymer with the amino resin crosslinking agent. Those skilled in the art will be aware that in certain embodiments the paint dispersion can be made up at a pH outside the pH range for application and later adjusted to the desired pH shortly before it is applied. A portion of the amine, e.g., preferably between about 60 and 100 percent of the amount chemically equivalent to the carboxyl functionality of the polymer is added to the solution polymer directly. Advantageously, a small additional portion of amine is used to raise the pH of the emulsion polymer to about 5 to about 10, preferably 5 to 9, prior to finishing the paint formulation so that the mill base is not subjected to the low pH environment of the polymer latex (pH about 2.5).

Suitable amines are amines (1) which are soluble in the aqueous medium of the paint, (2) that ionize sufficiently in such aqueous medium to solubilize the solution polymer, (3) that ionize sufficiently in such aqueous medium when employed in suitable amounts to provide the paint dispersion with a pH of at least about 7, preferably 7.2 or higher, and thereby keep the rate of reaction between reactive groups of the amino resin (crosslinking agent) negligible prior to curing, and (4) that allow for rapid curing of the enamel upon heating. Suitable amines include alkyl, alkanol and aryl primary, secondary and tertiary amines. Preferred are secondary and tertiaryalkyl and alkanol amines having a boiling point within the range of 80° – 200°C. By way of example, these include N,N-dimethyl ethanolamine, N,N-diethylethanolamine, isopropanolamine, morpholine, N-methyl-morpholine, N-ethylmorpholine, N-methylethanolamine, 2,6-dimethylmorpholine, methoxypropylamine, and 2-amino-2-methyl-1-propanol.

e. Catalysts

Catalysts for the curing of resins described herein are not normally required to obtain satisfactory film properties. If desired, however, for purposes of lowering the film baking temperature or of further improving cured film properties, strong acid catalysts can be employed in an amount not in excess of 3 percent by weight of the total finished paint formulation. Sais strong acid catalysts may be introduced either as copolymerizable species incorporated in one or both acrylic copolymers, e.g., 2-acrylamide-2-methylpropanesulfonic acid, or as a non-polymerizable additive, e.g., p-toluenesulfonic acid. It is generally preferred not to add such catalysts, however, as they may tend to increase the water sensitivity of the cured film and may deleteriously affect storage stability of the liquid paint.

f. Cosolvents

In those embodiments wherein a volatile organic solvent is employed as a cosolvent, i.e., solution of the solution polymer also being effected by the use of a water-soluble amine, the following solvents are suitable for this use include: n-propyl alcohol, isopropyl alcohol, butanol, 2-butoxyethanol, 2(2-butoxy)ethoxyethanol, n-octyl alcohol, dioxane, ethylene glycol monomethyl ether, ethylene glycol monoethyl ether, ethylene glycol monobutyl ether, diethylene glycol monomethyl ether, diethylene glycol monoethyl ether, diethylene glycol monoethyl ether, diethylene glycol monobutyl ether, ethylene glycol monomethyl ether acetate, diethylene glycol monoethyl ether acetate, etc.

DETAILED DESCRIPTION OF SECOND GENERAL METHOD FOR PREPARING PAINTS DESCRIBED HEREIN a. Preparation of Solution Polymer

In this method, the water-soluble copolymer is produced by emulsion polymerization. The functional monomers are mixed and reacted by conventional free-radical initiated polymerization in aqueous emulsion to obtain the copolymer desired. The resulting acid-functional copolymer latex is converted to a polymer solution by the addition of an appropriate base, usually ammonia or an organic amine.

Conventional surfactants, chain transfer agents, and initiators are employed in the emulsion polymerization. The monomer charge is usually emulsified by one or more micelleforming compounds composed of a hydrophobic part, such as a hydrocarbon group containing sic or more carbon atoms, and a hydrophilic part, such as hydroxyl group, alkali metal or ammonium carboxylate groups, phosphate or sulfate partial ester groups, sulfonate groups, or a polyether chain. Exemplary emulsifying agents include alkali metal sulfonates of styrene, naphthalene, decyl benzene and dodecyl benzene; sodium dodecyl sulfate; sodium stearate; sodium oleate, the sodium alkyl aryl polyether or sulfates and phosphates; the ethylene oxide condensates of long chain fatty acids, alcohols, and mercaptans, and the alkali metal salts of rosin acids. These materials and the techniques of their employment in emulsion formation and maintenance are well known in the art. As previously pointed out, however, when emulsion polymerization is used to produce a solution polymer, there is no need for the resulting latex to be stable under conditions different from those ensuing at the end of the polymerization process since the latex no longer exists as such after the polymer goes into solution upon neutralization. To facilitate such conversion to solution polymers, polymers prepared by emulsion polymerization for use as a solution polymer ordinarily contain a higher concentration of carboxyl groups and a lower concentration of decidedly hydrophobic monomers, e.g., 2-ethylhexyl acrylate, relative to the corresponding concentrations in the polymers prepared for use as emulsion polymers. Further, the teaching hereinbefore set forth with respect to the choice of initiators when preparing the latter, i.e., using an alkali metal or ammonium persulfate either as the sole polymerization initiator or as one constituent of a mixed initiator system to avoid coagulum formation through time and under a variety of pH conditions, solvent environment, etc., is applicable where the polymer is to be converted to a solution polymer. Such initiators may be used when preparing the solution polymer by emulsion polymerization but conventional peroxide initiators are quite suitable for this. Hence, this method offers an advantage, in this respect, in that the concentration of ionic inorganic contaminants, e.g., sulfate ions, in the paint formulation is reduced. A chain transfer agent or mixture of chain transfer agents may be added to the reaction medium to limit the molecular weight of the polymer, such chain transfer agents are generally mercaptans such as dodecanethiol, benzenethiol, 1-octanethiol, pentanethiol and butanethiol. These are conventional materials employed in a conventional manner. The polymerization initiator is composed of one or more water-soluble, free-radical-generating species such as hydrogen peroxide or the sodium, potassium or ammonium persulfates, perborates, peracetates, percarbonates and the like. As is well known in the art, these initiators may be associated with activating systems such as redox system which may incorporate mild reducing agents, such as sulfites and thiosulfites and redox reaction promoters such as transition metal ions. As hereinbefore mentioned, however, it is desirable to maintain a low concentration of non-polymeric ionic species in the finished paint formulation in order that the cured paint film may have optimum resistance to water. Hence, it is preferred to use a minimum concentration of such optional inorganic salts as ferrous sulfte, sodium bisulfite, and the like. Those skilled in the art will be aware that other emulsifying agents, polymerization initiators and chain transfer agents may be used which are compatible with the polymerization system herein required and with the attainment of acceptable cured paint film properties.

b. Preparation of Emulsion Copolymer

The emulsion copolymer may be prepared using the same procedures hereinbefore recited for preparation of the emulsion copolymer in part (b) of the first general method.

c. Formulation of Paint

The polymer solution and the polymer latex prepared according to the aforedescribed procedures may be subsequently converted into a paint using the same procedures hereinbefore recited for formulation of paint in part (c) of the first general method.

d. Use of Organic Amines

The use of organic amines and amines which are suitable for such use are the same for this general method as hereinbefore described in detail in part (d) of the first general method.

e. Catalysts

The use of catalysts and catalysts which are suitable for curing the resins hereinbefore described and hereinafter illustrated are the same for this general method as hereinbefore described in detail in part (d) of the first general method.

f. Cosolvents

The use and choice of cosolvents for use with this general method may be the same as hereinbefore described in part (f) of the first general method.

DETAILED DESCRIPTION OF THIRD GENERAL METHOD FOR PREPARING PAINTS DESCRIBED HEREIN

The third general method for preparing the paints disclosed herein is identical with the first general method hereinbefore described in detail except for the difference that all or a part of the surfactant, i.e., surface active agent or emulsifier, employed in preparing the emulsion polymer, is replaced with a stabilizer polymer, that is identical with or similar to, the solution polymer heretofore described in the first and second general methods and employed as a primary constituent of the paints described herein.

The stabilizer polymer of the third and fourth general methods is carboxy functional and soluble in the aqueous phase of these paint dispersions and is either the same as the primary solution polymer, heretofore discussed, or similar to such solution polymer and compatible with the system. The average molecular weight ($\overline{M}_n$) of the stabilizer polymer may be the same as that of the primary solution polymer, i.e., between 3,000 and 20,000 but advisedly is of lower molecular weight than the primary solution polymer. Preferably, the average molecular weight of this third copolymer is in the range of about 3,000 to about 8,000. Its Tg is in the range of −15° to 50°C. When the stabilizer polymer is used in lieu of the surfactant to prepare either the solution polymer or the emulsion polymer, it is present in a concentration in the range of about 0.2 to about 10, preferably about 0.5 to about 5, weight percent based on the weight of polymer to be prepared.

The stabilizer polymer may be prepared by any of several methods, including (1) the method used to prepare the solution polymer of the first general method of paint preparation, i.e., polymerization in solution in a water miscible or dilutable organic solvent; (2) the method used to prepare the solution polymer for the second general method of paint preparation, i.e., emulsion polymerization using an emulsifier or surfactant; (3) emulsion polymerization using in lieu of a surfactant a small amount of the intended polymer from a previous preparation; and (4) a method of emulsion polymerization described hereinafter which employs neither surfactant nor a water soluble polymer in lieu thereof. In the latter, conventional chain transfer agents and polymerization initiators are used as described hereinbefore for the preparation of a solution polymer by emulsion polymerization. A mixture of monomers including carboxyl functional monomers and a chain transfer agent is added slowly to a stirred mixture of initiator and water maintained at a suitable reaction temperature, e.g., between 45° and 95°C. It is preferred to add simultaneously with the monomer mixture an additional quantity of polymerization initiator to sustain a sufficient initiator concentration throughout the polymerization. The polymer latex so obtained is filtered and neutralized with ammonia or water-soluble amine to render it water soluble.

DETAILED DESCRIPTION OF FOURTH GENERAL METHOD FOR PREPARING PAINTS DESCRIBED HEREIN

The fourth general method for preparing the paints disclosed herein is identical with the second general method hereinbefore described in detail except for the difference that all or a part of the surfactant used to prepare the solution polymer, the emulsion polymer or, preferably, both the solution polymer and the emulsion polymer is replaced by a stabilizer polymer, such as heretofore described in detail in the description of the third general method.

This invention will be more fully understood from the following illustrative examples:

EXAMPLE 1

A heat-curable coating composition suitable for automotive topcoat application is prepared from an aqueous acrylic copolymer latex, an aqueous solution of a second acrylic copolymer, and an amino resin crosslinking agent, here a melamine resin, in the manner hereinafter set forth:

STEP I PREPARATION OF ACRYLIC COPOLYMER LATEX

| Monomers and Additives | Parts by Weight |
|---|---|
| methyl methacrylate | 41 |
| methacrylic acid | 4 |
| ethyl acrylate | 35 |
| butyl acrylate | 20 |
| 1-octanethiol | 1 |
| Triton X-200[1] | 1 |
| Triton X-305[2] | 4.5 |
| Water | 70 |
| potassium persulfate | 0.4 |
| Reactor Charge | |
| Water | 30 |
| Triton X-200 | 2 |
| potassium persulfate | 0.1 |

[1] a product of Rohm and Haas Company, characterized as an anionic surfactant containing 28% active component described as the sodium salt of an alkyl aryl polyether sulfonate.
[2] a product of Rohm and Haas Company, characterized as a nonionic surfactant containing 70% active component described as an alkylarylpolyether alcohol averaging 30 ethylene oxide units per molecule.

The reactor charge is heated to 50°C. in a reaction vessel equipped for a stirrer, reflux condenser, nitrogen inlet type, addition funnel and theremometer. The monomer mixture is mixed with the listed additives and an emulsion is formed by stirring. The monomer emulsion is added over a four and one-half hour period. The temperature is maintained at 50° ± 5°C throughout the monomer addition and for 2 hours thereafter. A nitrogen sparge is maintained throughout. The latex so formed is cooled to room temperature, filtered, and formulated into paint as hereinafter described. The molecular weight of the polymer so prepared ($\overline{M}_n$) is about 6,000. Its glass transition temperature, Tg, is about 14°C (calculated from the monomeric composition without regard to molecular weight as are all Tg values herein given).

STEP II PREPARATION OF WATER SOLUBLE ACRYLIC POLYMER

| Monomer Mixture and Initiator | Parts by Weight |
|---|---|
| methacrylic acid | 15.0 |
| methylmethacrylate | 15.0 |
| styrene | 20.0 |
| butyl acrylate | 40.0 |
| butyl methacrylate | 10.0 |
| t-butylperoctoate | 3.5 |
| Reactor Charge | |
| isopropyl alcohol | 45 |

A mixture of the monomers and initiator listed is added to refluxing isopropyl alcohol over a 90 minute period. An additional initiator change - 0.2 parts t-butylperoctoate in 5 parts isopropyl alcohol- is added 30 minutes after completion of the monomer addition. The reaction mixture is maintained at reflux an additional 2 hours, cooled to room temperature, neutralized with 90 percent of the calculated equivalent weight (based on acid functional comonomer) of dimethylethanolamine, and reduced to 60 percent by weight solids with water. The polymer thus prepared has molecular weight ($\overline{M}_n$) of about 9,200. The glass transition temperature of this polymer is about 18°C.

STEP III FORMULATION OF PAINT

A mill base is prepared by pebble milling together the following materials:

| Components | Parts by Weight |
|---|---|
| polymer solution from Step 2 | 5.5 |
| titanium dioxide pigment | 13.8 |
| Water | 3.3 |

An enamel is then prepared by blending this mill base with the following materials:

| Components | Parts by Weight |
|---|---|
| latex from Step I | 42.5 |
| Water | 19.0 |
| isopropanol | 1.0 |
| propylene glycol | 5.1 |
| melamine crosslinking agent, Cymel 300[1] | 4.6 |
| 10% aqueous dimethylethanolamine | 1.4 |
| 10% aqueous p-toluenesulfonic acid[2] | 3.8 |

[1] a product of American Cyanamid Company, and a commercial grade of hexamethoxymethylmelamine.
[2] the solution is adjusted to pH 8 by addition of dimethylaminoethanol.

The enamel so obtained is reduced with water to spray viscosity (20 seconds - Ford Cup No. 4 follows ASTM D-1200), applied to primed steel panels, i.e., mild steel panels to which has been applied a standard epoxy type automotive primer, by spraying and cured for 20 minutes at 180°C. The cured film has a 20° gloss of 75, determined by ASTM D-523. This film demonstrates no visible change after soaking in water at 32°C for 240 hours. This film displays excellent solvent resistance. The film flexibility and hardness are suitable for automobile topcoats.

EXAMPLE 2

The procedures of Example 1 are repeated with the following differences: (1) the monomer emulsion of Step I is prepared from the following reactant monomers and chain transfer agent, all other materials employed in preparing the latex being the same in kind and quantity as in Example 1:

| Materials | Parts by Weight |
|---|---|
| methyl methacrylate | 49.0 |
| methacrylic acid | 5.0 |
| ethyl acrylate | 16.0 |
| butyl acrylate | 30.0 |
| 1-octanethiol | 0.4 |

The molecular weight of this polymer ($\overline{M}_n$) is about 13,300 and has a glass transition temperature of about 20°C.

A paint is formulated according to the procedures of Example 1 using the following components:

| Components | Parts by Weight | |
|---|---|---|
| | Mill Base | Let Down |
| latex from Step I | — | 44.0 |
| polymer solution from Step 2 | 5.5 | — |
| titanium dioxide pigment | 16.5 | — |
| Water | 4.0 | 21.0 |
| 10% aqueous dimethyl-aminoethanol | — | 4.0 |
| isopropyl alcohol | — | 5.0 |
| n-butanol | — | 4.0 |
| Cymel 300[1] | — | 6.0 |

[1]defined in Example 1

The resultant paint is adjusted to 25 seconds Ford Cup No. 4 viscosity by addition of water, applied to primed steel panels, and subjected to a twenty-minute bake cycle at temperatures moving upward from 80°C to 180°C and remaining at 180°C lasting for about 10 minutes.

EXAMPLE 3

The procedures of Example 2 are repeated with the single difference that, in the preparation of the emulsion polymer in Step I, the monomer emulsion is prepared from the following reactant monomers and chain transfer agent, all other materials employed in preparing the latex being the same in kind and quantity as in Examples 1 and 2.

| Materials | Parts by Weight |
|---|---|
| methyl methacrylate | 49.0 |
| methacrylic acid | 5.0 |
| ethyl acrylate | 16.0 |
| butyl acrylate | 30.0 |
| 1-octanethiol | 0.2 |

The molecular weight of this polymer ($\overline{M}_n$) is about 17,500 and its Tg is about 20°C.

EXAMPLE 4

The procedures of Example 2 are repeated with the single difference that, in the preparation of the emulsion polymer in Step I, there is used 0.1 parts by weight of 1-octanethiol, all other materials employed in preparing the latex being the same in kind and quantity as in Example 2.

The molecular weight of this polymer ($\overline{M}_n$) is about 24,000 and its Tg is about 20°C.

EXAMPLE 5

The procedures of Example 2 are repeated with the difference that, in the preparation of the emulsion polymer in Step I, the monomer emulsion is prepared from the following reactant monomers and chain transfer agent, all other materials employed in preparing the latex being the same in kind and quantity as in Examples 1 and 2.

| Materials | Parts by Weight |
|---|---|
| methyl methacrylate | 50.0 |
| methacrylic acid | 5.0 |
| ethyl acrylate | 35.0 |
| butyl acrylate | 10.0 |
| 1-octanethiol | 0.4 |

The molecular weight of this polymer ($\overline{M}_n$) is about 13,000 and its Tg is about 32°C.

EXAMPLE 6

The procedures of Example 2 are repeated with the single difference that, in the preparation of the emulsion polymer in Step I, the monomer emulsion is prepared from the following reactant monomers and chain transfer agent, all other materials employed in preparing the latex being the same in kind and quantity as in Examples 1 and 2.

| Materials | Parts by Weight |
|---|---|
| methyl methacrylate | 25.0 |
| methacrylic acid | 7.0 |
| styrene | 20.0 |
| butyl methacrylate | 30.0 |
| butyl acrylate | 18.0 |
| 1-octanethiol | 0.4 |

The molecular weight of this polymer ($\overline{M}_n$) is about 13,000 and its Tg is about 40°C.

EXAMPLE 7

A heat-curable coating composition is prepared in the following manner:

STEP I PREPARATION OF THE ACRYLIC COPOLYMER LATEX

| Monomers and Additives | Parts by Weight |
|---|---|
| styrene | 20.0 |
| hydroxypropylmethacrylate | 18.0 |
| 2-ethyl hexyl acrylate | 20.0 |
| butyl methacrylate | 30.0 |
| acrylic acid | 2.0 |
| methyl methacrylate | 10.0 |
| Water | 90.0 |
| 1-octanethiol | 0.5 |
| Triton X-200[1] | 1.2 |
| Triton X-305[2] | 3.6 |
| potassium persulfate | 0.4 |
| Reactor Charge | |
| Water | 60.0 |
| Triton X-200[1] | 1.7 |
| potassium persulfate | 0.1 |

[1]defined in Example 1
[2]defined in Example 1

The reactor charge is heated quickly to boiling and cooled to 95°C. The reactant monomers are mixed with the listed additives and an emulsion is formed by stirring. The monomer emulsion is then added to the hot reactor charge over a two-hour period. The temperature is maintained at about 90°C during and for two hours following the addition of the monomer emulsion. The latex is cooled to room temperature, filtered and formulated into a paint as hereinafter described. This polymer has average molecular weight ($\overline{M}_n$) of about 10,000 and a Tg of about 15°C.

STEP II PREPARATION OF WATER-SOLUBLE ACRYLIC POLYMER

A water-soluble, acrylic copolymer is prepared from the following materials:

| Monomer Mixture and Initiator | Parts by Weight |
|---|---|
| styrene | 15.0 |
| hydroxypropylmethacrylate | 10.0 |
| acrylic acid | 8.0 |
| butyl methacrylate | 37.0 |

-Continued

| Monomer Mixture and Initiator | Parts by Weight |
|---|---|
| 2-ethyl hexyl acrylate | 20.0 |
| methyl methacrylate | 10.0 |
| t-butyl perbenzoate | 3.0 |
| Reactor Charge | |
| 2(2-butyoxyethoxy) ethanol | 43 |

The reactor charge is heated to 130°C under a nitrogen atmosphere. The mixture of monomers and initiator is added over a 2.5 hour period. The temperature is maintained at about 130°C during and for 2.5 hours following the monomer addition. The polymer solution obtained is cooled to room temperature, neutralized with 90 percent of the calculated equivalent weight (based on acid functional comonomer) of dimethylaminoethanol, and reduced to 60 percent solids with water. This polymer has average molecular weight ($\overline{M}_n$) of about 5,000 and its Tg is about 17°C.

STEP III FORMULATION OF PAINT

A mill base is prepared by ball milling the following materials:

| Materials | Parts By Weight |
|---|---|
| Polymer from Step II | 76.5 |
| Titanium dioxide pigment | 180.5 |
| Water | 40.0 |

An enamel is formulted by blending this mill base with the following materials:

| Materials | Parts by Weight |
|---|---|
| Cymel 301[1] | 69.5 |
| n-butanol | 55.5 |
| 2(2-butoxyethoxy)ethanol | 20.8 |
| latex from Step I | 382.0 |
| 10% aqueous dimethylaminoethanol | 41.7 |
| Water | 133.5 |

[1]a commercial grade of hexamethoxymethylmelamine marketed by American Cyanamid Company.

The paint so obtained is reduced with water to spray viscosity (17 seconds, Ford Cup No. 4), applied to primed steel panels and subjected to a 30-minute bake cycle comprising ten minutes during which the temperature rises from 80° to 160°C during the first 10 minutes and remains at 160°C for 10 minutes. The cured film has a 20° gloss of 80, is unaffected by xylene (one minute exposure), or by exposure to water at 32°C for 240 hours.

EXAMPLE 8

The procedures of Example 7 are repeated with the single difference that, in the preparation of the emulsion polymer in Step I, the monomer emulsion is prepared from the following reactant monomers and chain transfer agent, all other materials employed in preparing the latex being the same in kind and quantity as in Examples 1 2.

| Materials | Parts by Weight |
|---|---|
| styrene | 20.0 |
| methacrylic acid | 15.0 |
| butyl acrylate | 55.0 |
| butyl methacrylate | 10.0 |
| 2-acrylamide - 2 - methylpropane sulfonic acid | 1.0 |
| 1-octanethiol | 0.7 |

This polymer has average molecular weight ($\overline{M}_n$) of about 8,000 and a Tg of about −5°C.

EXAMPLE 9

A heat-curable coating composition is prepared in the following manner:

STEP I PREPARATION OF ACRYLIC COPOLYMER LATEX

| Monomers and Additives | Parts by Weight |
|---|---|
| methyl methacrylate | 48.0 |
| methacrylic acid | 7.0 |
| ethyl acrylate | 35.0 |
| butyl acrylate | 10.0 |
| 1-octanethiol | 0.4 |
| Triton X-200[1] | 1.0 |
| Triton X-305[2] | 4.5 |
| Water | 90 |
| ammonium persulfate | 0.4 |
| Reactor Charge | |
| Water | 30 |
| Triton X-200?200[1] | 2 |
| ammonium persulfate | 0.1 |

[1]defined in Example 1.
[2]defined in Example 1.

The procedures of Step I, Example 1, are repeated to produce a latex of 40 percent solids. This polymer has average ($\overline{M}_n$) of about 13,000 and a Tg of about 32°C.

STEP II PREPARATION OF WATER SOLUBLE ACRYLIC POLYMER

The procedures of Step II, Example 7 are duplicated.

STEP III FORMULATION OF PAINT

A mill base is prepared by pebble milling together the following materials:

| Materials | Parts by Weight |
|---|---|
| polymer solution of Step II | 11.0 |
| Cymel 300[1] | 8.0 |
| titanium dioxide pigment | 19.7 |
| isopropanol | 4.0 |
| n-butanol | 5.0 |
| Water | 6.0 |

[1]defined in Example 1.

An enamel is prepared by blending this mill base with the following materials:

| Materials | Parts by Weight |
|---|---|
| latex from Step I | 55.0 |
| 10% aqueous dimethylethanolamine | 4.0 |
| Water | 13.0 |
| 10% aqueous p-toluene sulfonic acid (neutralized with dimethylethanol amine) | 0.6 |

EXAMPLE 10

The procedures of Example 1 are repeated with the single difference that in the preparation of the soluble polymer of Step II 2.5 parts t-butylperbenzoate are used in lieu of 3.5 parts of t-butylperoctoate. The polymer so obtained has average molecular weight ($\overline{M}_n$) of about 10,500.

EXAMPLE 11

The procedures of Example 7 are repeated with the single difference that in the preparation of the soluble polymer of Step II, 3 parts t-butylperoctoate are used in lieu of 3 parts t-butyl perbenzoate. The polymer thus obtained has an average molecular weight ($\overline{M}_n$) of about 6,000.

EXAMPLE 12

The procedures of Example 9 are repeated with the difference that the water soluble resin of Step II is prepared from the following materials:

| Reactant Monomers and Initiator | Parts by Weight |
|---|---|
| hydroxypropyl methacrylate | 10 |
| acrylic acid | 8 |
| styrene | 25 |
| 2-ethylhexylacrylate | 26 |
| butyl methacrylate | 26 |
| t-butylperbenzoate | 3 |
| Reactor Charge | |
| 2-butoxyethanol | 43 |

The polymerization is carried out at temperatures between 120° and 135°C. The polymer has an average molecular weight $\overline{M}_n$) of about 6,000.

EXAMPLE 13

The procedures of Example 12 are repeated with the difference that 5 parts of acrylonitrile are substituted for 5 parts of styrene.

EXAMPLE 14

The procedures of Example 7 are repeated with the difference that the water soluble resin is prepared from:

| Monomer Reactants and Initiator | Parts by Weight |
|---|---|
| methyl methacrylate | 50 |
| ethyl acrylate | 42 |
| methacrylic acid | 8 |
| 5-butyl peroctoate | 3.5 |
| Reactor Charge | |
| isopropanol | 45 |

The polymerization is carried out at reflux following the procedures of Step II of Example 1. The average molecular weight ($\overline{M}_n$) of this polymer is about 9,000.

EXAMPLE 15

The procedures of Example 7 are repeated with the difference that the water soluble resin is prepared from the following materials:

| Monomer Reactants and Initiator | Parts by Weight |
|---|---|
| methacrylic acid | 18 |
| butyl acrylate | 55 |
| methyl methacrylate | 27 |
| AIBN[1] | 3 |
| Reactor Charge | |
| isopropanol | 45 |

The polymerization is carried out at reflux following the procedures of Step II of Example 1. The polymer so obtained has average molecular weight of about 5,000 and a Tg of 2°C.

EXAMPLE 16

The procedures of Example 15 are repeated with the difference that the soluble resin is prepared from the following materials:

| Monomer Reactants and Initiator | Parts by Weight |
|---|---|
| hydroxypropyl methacrylate | 10 |
| methacrylic acid | 10 |
| butyl acrylate | 55 |
| methyl methacrylate | 25 |
| AIBN | 4 |
| Reactor Charge | |
| isopropanol | 45 |

The polymer thus obtained has average molecular weight ($M_n$) of about 4,000 and its Tg is about −1°C.

EXAMPLE 17

The procedures of Example 15 are repeated with the difference that the water soluble resin is prepared from:

| Monomer Reactants and Initiator | Parts by Weight |
|---|---|
| hydroxypropylmethacrylate | 5 |
| methacrylic acid | 10 |
| N-methylolacrylamide | 3 |
| methyl methacrylate | 37 |
| butyl acrylate | 30 |
| butyl methacrylate | 20 |
| t-butyl peroctoate | 3 |
| Reactor Charge | |
| isopropanol | 45 |

EXAMPLE 18

The procedures of Example 1 are repeated with the difference that the ratio of polymer obtained from the latex of Step I to that of the solution polymer of Step II is varied as follows:

| Polymer | Parts by Weight | | | | | |
|---|---|---|---|---|---|---|
| | A | B | C | D | E | F |
| polymer from latex | 92 | 85 | 75 | 65 | 50 | 35 |
| polymer from solution | 8 | 15 | 25 | 35 | 50 | 65 |

Coatings B, C, and D display acceptable gloss (equal to or greater than 70 at 20°) and appearance, and are nearly equivalent in terms of tendency to sag and run during spray application. Coating A is marginally acceptable, it displays lower gloss (65–70 at 20°). Coatings E and F are inferior to coatings B-D; they have excellent gloss, but display a greater tendency to sag during spray application, and considerably more solvent popping during cure at a given wet film thickness than do coatings A–D.

EXAMPLE 19

The procedures of Example 1 are repeated with the differences that the formulation of paint is as follows:

| Mill Base | Parts by Weight |
|---|---|
| polymer solution from Step II | 5.5 |
| titanium dioxide pigment | 13.8 |
| Water | 3.3 |
| Other Components | |
| latex from Step I | 42.5 |
| Water | 20.0 |
| isopropanol | 1.3 |
| n-butanol | 5.0 |
| Resimene X-735[1] | 7.2 |
| 10% aqueous dimethylethanolamine | 1.4 |

[1] a product of Monsanto Company and a water reducible methylated melamine resin supplied at 80% solids in isopropanol.

This enamel is cured by baking at 140°C for 20 minutes.

In the preceding 19 examples, the water-based paint has been formulated from an amino resin cross-linking agent, a synthetic polymer latex and a polymer soluble in the aqueous phase with the latter prepared by solution polymerization in an alcohol or similar water dilutable organic solvent. All such paints retain some of this solvent.

In the eight examples immediately following, both the solution resin and the emulsion resin are prepared by emulsion polymerization. The paints thus prepared are free of organic solvent unless such solvent is deliberately added.

EXAMPLE 20

STEP I PREPARATION OF THE SOLUTION POLYMER

An acrylic copolymer soluble in the aqueous phase of the water-based paint of which it later becomes a part is prepared from the following materials in the manner hereinafter described:

| Materials | Parts by Weight |
|---|---|
| methyl methacrylate | 45.0 |
| methacrylic acid | 15.0 |
| butylacrylate | 40.0 |
| Water | 90.0 |
| Triton X-200[1] | 1.15 |
| Triton X-305[2] | 3.58 |
| potassium persulfate | 0.4 |
| 1-octanethiol | 1.5 |
| Reactor Charge | |
| Water | 60.0 |
| Triton X-200[1] | 1.67 |
| potassium persulfate | 0.1 |

[1] defined in Example 1.
[2] defined in Example 2.

The reactor charge is heated quickly to boiling and cooled to 95°C. A monomer emulsion is formed from the above by mixing and stirring. The monomer emulsion is added to the hot reactor charge over a 2-hour period. The temperature is maintained at 90° ± 5°C throughout the monomer addition period and for two hours after addition is complete. The 2-(dimethylamino) ethanol is added in an amount equivalent to the acid monomer incorporated in the polymer and the solids content is reduced with water to 30 percent by weight. The polymer ($\overline{M}_n$) is about 5,000 and the Tg is calculated to be 25°C.

STEP II PREPARATION OF THE EMULSION POLYMER

An emulsion polymer is prepared following the procedure of Step I from the following reactant monomers and chain transfer agent, all other materials employed in preparing this latex being the same in kind and quantity as in Example 1.

| Materials | Parts by Weight |
|---|---|
| methyl methacrylate | 48.0 |
| methacrylic acid | 7.0 |
| ethyl acrylate | 35.0 |
| butyl acrylate | 10.0 |
| 1-octanethiol | 0.4 |

The average molecular weight of this copolymer is about 10,000 and it has a Tg of about 40°C.

STEP III FORMULATION OF PAINT (FREE OF ORGANIC SOLVENT)

A mill base is prepared by pebble milling together the following materials:

| Materials | Parts by Weight |
|---|---|
| polymer solution from Step I | 18.4 |
| Cymel 300[1] | 6.7 |
| titanium dioxide pigment | 16.5 |
| Water | 8.3 |

[1] defined in Example 1.

An enamel is formulated by blending together the following materials:

| Materials | Parts by Weight |
|---|---|
| latex from Step II | 46.0 |
| 10% aqueous 2-(dimethylamino)ethanol | 3.3 |
| 10% aqueous p-toluene sulfonic acid (neutralized with 2-(dimethylamino) ethanol) | 0.8 |
| mill base | 49.9 |

The viscosity of the paint is adjusted to 17-20 seconds (No. 4 Ford Cup), and sprayed on primed steel panels. The panels are baked 25 minutes. The baking temperature at the beginning is 80°C. This is increased gradually to 180°C and maintained at 180°C over a ten-minute period. The resultant panels have a coating of excellent gloss and organic solvent resistance (one minute xylene exposure). Appearance and hardness do not noticeably change when water soaked at 32°C.

EXAMPLE 21

The procedures of Example 20 are repeated with the following differences: (1) the reactant monomers and the chain transfer agent used in the monomer emulsion of Step II are as follows:

| Reactant Monomers and Chain Transfer Agent | Parts by Weight |
|---|---|
| methyl methacrylate | 49.0 |
| methacrylic acid | 5.0 |
| butyl acrylate | 30.0 |
| ethyl acrylate | 16.0 |
| 1-octanethiol | 0.1 | and (2) the reactor charge is heated up to 55° ± 5°C with nitrogen purging. The emulsified monomers are added for a period of four hours. Reaction is continued for another two hours with the temperature maintained at 55° ± 5°C. The latex thus obtained is cooled, filtered, and used in the formulation of a water-based enamel as in Example 20.

EXAMPLE 22

A series of water dilutable polymers are prepared as in Step I of Example 20 and employed in place of the water dilutable polymer of Step I, Example 20 in the water-based paint described in Example 20. The procedures of preparation are the same as used in Step I of Example 20. The materials employed in preparing these "solution polymers" and the molecular weights and glass transition temperatures of the resultant copolymers are set forth below:

| Materials | Polymer Designation | | | | |
|---|---|---|---|---|---|
| | A | B | C | D | E |
| styrene | | 25 | | | |
| methyl methacrylate | 50 | | 45 | 35 | 35 |
| methacrylic acid | 10 | 15 | 15 | 15 | 15 |
| butyl acrylate | 30 | 25 | 40 | 50 | 50 |
| ethyl acrylate | 10 | | | | |
| butyl methacrylate | | 35 | | | |
| Triton X-200 | 2.8 | | | | 2.8 |
| Triton X-305 | 3.6 | 3.6 | 3.6 | 3.6 | 3.6 |
| Aerosol 22[(1)] | | 2.4 | 2.4 | 2.4 | |
| 1-octanethiol | 1 | 1.5 | 2 | 1.5 | 1 |
| Properties of Polymer | | | | | |
| ($\overline{M}_n$) | 7500 | 5400 | 4000 | 5400 | 7500 |
| Tg, °C | −8 | 16 | 25 | 8 | 8 |

[(1)]Aerosol 22 is a product of American Cyanamid Company.

EXAMPLE 23

A series of emulsion polymers are prepared as in Step II of Example 20 and employed in place of the emulsion polymer of Step II, Example 20. The procedures are the same as used in Step II of Example 20. The materials employed in preparing these "emulsion polymers" and the molecular weights and glass transition temperatures of the resultant copolymers are set forth in the following table:

| MATERIALS | POLYMER DESIGNATION | | | | | | | | |
|---|---|---|---|---|---|---|---|---|---|
| | A | B | C | D | E | F | G | H | I |
| Styrene | 20 | 25 | 25 | 20 | 20 | 20 | 20 | 20 | 20 |
| Methyl Methacrylate | 25 | | 25 | | | | | | |
| Methacrylic Acid | 7 | 10 | 7 | 7 | 13 | 15 | | 15 | 15 |
| Acrylic Acid | | | | | | | 22 | | |
| Butyl Acrylate | 23 | 15 | 20 | 23 | 50 | 55 | 50 | 55 | 50 |
| Butyl Methacrylate | 25 | 50 | 40 | 25 | 17 | 10 | 10 | 10 | 15 |
| Hydroxypropyl Methacrylate | | | 8 | | | | 18 | | |
| 2-Acrylamide - 2 - Methyl Propane Sulfonic Acid | | | | | | | | 1 | 1 |
| Triton X-200 | | | | 2.9 | 2.9 | 2.9 | 2.9 | 2.9 | 2.9 |
| Triton X-302 | 3.6 | 3.6 | 3.6 | 3.6 | 3.6 | 3.6 | 3.6 | 3.6 | 3.6 |
| Aerosol 22 | 2.4 | 2.4 | 2.4 | | | | | | |
| 1-Octanethiol | 0.2 | 1 | 0.4 | 0.4 | 0.7 | 0.7 | 0.7 | 0.5 | 0.8 |
| PROPERTIES OF POLYMER | | | | | | | | | |
| $\overline{M}_n$ | 17,500 | 7,500 | 13,500 | 14,000 | 8,000 | 8,000 | 8,000 | 10,000 | 7,600 |
| Tg, °C | 33 | 31 | 27 | 33 | −2 | −5 | −6 | −5 | 0 |

EXAMPLE 24

Water-based enamel is prepared by mixing the following materials:

| Materials | Parts by Weight |
|---|---|
| Mill Base (prepared by pebble milling) | |
| polymer (solution polymer) from Step I, Example 20 | 18.8 |
| Cymel 300[(1)] | 4.6 |
| titanium dioxide pigment | 16.9 |
| Water | 7.3 |
| Other Materials (to let down) | |
| polymer (emulsion polymer from Example 21 | 47.0 |
| 10% aqueous 2(dimethylamino)ethanol | 4.4 |
| 10% aqueous p-toluene sulfonic acid (neutralized with 2-(dimethylamino) ethanol | 1.0 |

[(1)]defined in Example 1.

The above enamel is sprayed on primed steel panels and baked for 25 minutes. The initial temperature of the bake is 80°C and this is raised gradually to 180°C where the latter temperature is maintained for 10 minutes. The appearance of the baked panel and the properties of the baked coating are essentially the same as those obtained in Example 20.

EXAMPLE 25

A water-based enamel is prepared by mixing the following materials:

| Mill Base (prepared by ball milling) | Parts by Weight |
|---|---|
| polymer "D" of Example 22 (solution polymer) | 18.5 |
| Cymel 301[(1)] | 7.6 |
| titaniuim dioxide pigment | 16.5 |
| Water | 8.4 |
| Other Materials (to let down) | |
| polymer "G" of Example 23 (emulsion) polymer | 46.1 |
| 10% aqueous 2-(dimethylamino)ethanol | 2.9 |

[(1)]a product of American Cyanamid Company, and a commercial grade of hexamethoxymethylmelamine.

This enamel is adjusted to a viscosity of 17–20 seconds (No. 4 Ford Cup), by adding water and sprayed over primed steel panels. The coated steel panels are baked at 160°C for 25 minutes. The baked coatings exhibit good gloss, good solvent resistance and retained their gloss and hardness after soaking in water at 32°C for 240 hours.

EXAMPLE 26

A water-based enamel is prepared by mixing the following materials:

| Mill Base (prepared by ball milling) | Parts by Weight |
|---|---|
| Polymer "A" of Example 22 (solution polymer) | 14.8 |
| Cymel 300[1] | 4.5 |
| titanium dioxide pigment | 17.7 |
| Water | 9 |
| Other Materials (to let down) | |
| polymer "A" of Example 23 (emulsion polymer) | 49.4 |
| 10% aqeuous 2(dimethylamino)ethanol | 3.6 |
| 10% aqueous p-toluene sulfonic acid | 11 |

[1]defined in Example 1.

This enamel is adjusted to a viscosity of 20 seconds (No. 4 Ford Cup) by adding water, and sprayed over primed steel panels. These coatings are baked for 25 minutes. The initial baking temperature is 80°C and this is gradually raised to 180°C where it is maintained for at least 10 minutes. These coatings exhibit good physical properties.

EXAMPLE 27

A water-based enamel is prepared by mixing the following materials:

| Mill Base (prepared by ball milling) | Parts by Weight |
|---|---|
| Polymer "B" of Example 22 (solution polymer | 12.4 |
| titanium dioxide pigment | 16.3 |
| Cymel 301[1] | 8.3 |
| Water | 8.3 |
| Other Materials (to let down) | |
| Polymer "I" of Example 23 (emulsion polymer) | 45.6 |
| 10% 2-(dimethylamino)ethanol | 9.1 |

[1]defined in Example 25

This enamel is adjusted to a viscosity of 20 seconds (No. 4 Ford Cup) by adding water and sprayed on primed steel panels. The coated panels are baked at 160°C for 25 minutes. The coatings thus obtained exhibit excellent gloss 80 at 20° and good solvent resistance.

The following examples illustrate method emdodiments wherein the paints of this invention are prepared by substituting for the surfactant used in the preceding examples a stabilizer polymer which is a solution polymer, i.e., a polymer that is soluble in the aqueous phase of the water-based paint. As aforementioned, this stabilizer polymer may be the same as the solution polymer which is a primary constituent of the paint or it may differ therefrom so long as it is crosslinkable with another polymer or crosslinking agent in the system and is otherwise compatible with the system. The average molecular weight of the stabilizer polymer may be the same as that of the primary solution polymer but preferably has lower molecular weight and most preferably has average molecule weight ($\overline{M}_n$) in the range of about 3,000 to about 8,000. The stabilizer polymer will ordinarily be present in an amount in the range of about 0.5 to about 10 weight percent of the combined weights of emulsion polymerized polymers in the paint.

EXAMPLE 28

A water-based paint is prepared from the following materials:

Step I Preparation of Stabilizer Polymer

There is charged to a reactor 200 parts of water. The reactor charge is heated to boiling and then cooled to 95°C. To the reactor charge is added Solution A, a solution of 0.1 parts of ammonium persulfate in 0.8 parts of water. A solution, hereinafter termed Solution B, is prepared from 0.4 parts of ammonium persulfate in 2.5 parts water. A reactant monomer and chain transfer agent mixture is formed from the following materials:

| Materials | Parts by Weight |
|---|---|
| methyl methacrylate | 35 |
| methacrylic acid | 15 |
| butyl acrylate | 50 |
| 1-octanethiol | 2 |

The monomer mixture and Solution B are simultaneously charged to the reactor by incremental addition over a 2-hour period. The temperature of the reaction mixture is maintained for 3 hours after addition of the last of the reactants. The latex so obtained is cooled to room temperature and filtered. The polymer thus obtained, hereinafter termed stabilizer polymer I, is then neutralized with 2-(dimethylamino) ethanol in an amount equivalent to the acid monomer content of the polymer. A clear solution is obtained.

Step II Preparation of Emulsion Polymer

An emulsion polymer is produced by first preparing the following: (1) there is charged to the reactor 200 parts of water and 4.25 parts of the stabilizer polymer from Step I; (2) the following materials are thoroughly mixed:

| Materials | Parts by Weight |
|---|---|
| styrene | 20.0 |
| methacrylic acid | 15.0 |
| butyl acrylate | 55.0 |
| butyl methacrylate | 10.0 |
| 1-octanethiol | 0.6 |

(3) there are dissolved in 0.5 parts of ammonium persulfate and one part of 2-acrylamide-2-methylpropanesulfonic acid in 2.5 parts of water; and (4) there is dissolved 0.2 parts of ammonium persulfate in 5 parts of water. After these are prepared the emulsion polymer is prepared using the procedure and conditions used to prepare the stabilizer polymer of Step I. In such, the order of addition of the four above listed components is as follows: (4) is added to (1) in the reactor and (2) and (3) are added simultaneously to the mixture of (1) and (4).

Step III Preparation of the Solution Polymer

The procedures and steps of Step II of this example are repeated with the following employment of reactant monomers:

| Materials | Parts by Weight |
|---|---|
| methyl methacrylate | 35 |
| methacrylic acid | 15 |
| butyl acrylate | 50 |
| 1-octanethiol | 1 |

After this latex is cooled and filtered, it is neutralized with 2-(dimethylamino)ethanol to the amount equivalent to the methacrylic acid constituent of the polymer.

Step IV Preparation of the Organic Solvent-Free, Surfactant-Free Hybrid Water-Based Enamel

| Materials | Parts by Weight |
|---|---|
| solution polymer from Step III | 14.1 |
| Cymel 300 | 6.5 |
| titanium dioxide | 16.1 |
| Water | 6.4 |

The above materials are ball milled for 16 hours and mixed (let down) with the following materials:

| Materials | Parts by Weight |
|---|---|
| latex from Step II (includes both emulsion polymer and stabilizer polymer I) | 47.3 |
| 10% aqueous 2-(dimethylamino) ethanol | 9.6 |

The enamel thus prepared is adjusted to a viscosity of 17–20 seconds (No. 4 Ford Cup) by adding water. It is sprayed on primed steel panels and baked for 25 minutes at 160°C. The coatings thus obtained exhibit good appearance, gloss and solvent resistance.

EXAMPLE 29

A water-based enamel is prepared in from the following materials:

Step I Preparation of Latex (includes stabilizer) polymer and emulsion polymer)

1. There is charged to a reactor 127 parts of water and two parts of the stabilizer polymer prepared in Step I of Example 28.
2. The following reactant monomers and chain transfer agent are thoroughly mixed.

| Materials | Parts by Weight |
|---|---|
| styrene | 20.0 |
| hydroxypropylmethacrylate | 14.0 |
| methacrylic acid | 6.0 |
| butyl acrylate | 30.0 |
| butyl methacrylate | 30.0 |
| 1-octanethiol | 0.6 |

3. There is dissolved 0.5 parts of ammonium persulfate in 16.7 parts of water.
4. There is dissolved 0.1 parts of ammonium persulfate in 16.7 parts of water.

The reactor charge is heated to boiling and cooled to 95°C. After the solution of (4) is charged to the reactor, there is added to the reaction medium 0.45 parts of the monomer mixture of (2) and the temperature is held at 95°C without further addition of reactants for 15 minutes. The remaining portion of the monomer mixture is added simultaneously and incrementally with the solution of (3) over a 2–3 hour period, while the temperature is maintained. The temperature is maintained at 95°C for 2 hours after the addition of monomers is complete. The latex so obtained is cooled and filtered.

Step II Coating Formulation

The latex obtained in Step I of this example is substituted for the latex of Step II of Example 28 and a water-based enamel is prepared using the procedures and other ingredients used to prepare the water-based enamel in Example 28.

EXAMPLE 30

The procedures of Example 28 are repeated with the difference that the solution resin (Step III) is prepared from the following materials:

1. There is charged to the reactor 119 parts of water and 1.8 parts of the stabilizer polymer prepared in Step I of Example 28.
2. The following reactant monomers and chain transfer agent are thoroughly mixed.

| Materials | Parts by Weight |
|---|---|
| butyl methacrylate | 10.0 |
| methyl methacrylate | 35.0 |
| methacrylic acid | 15.0 |
| butyl acrylate | 40.0 |
| 1-octanethiol | 1.3 |

3. There is dissolved 0.5 part of ammonium persulfate in 25 parts of water.
4. There is dissolved 0.2 parts of ammonium persulfate in 5 parts of water.

After the latex preparation procedures of Example 28 are carried out and the resultant latex is cooled and filtered, the polymer is neutralized with water-soluble amine as in the preceding examples.

EXAMPLE 31

A surfactant-free hybrid water-based enamel containing organic solvent is prepared using the formulation procedures of Step IV of Example 28 with the following differences:

| Materials | Parts by Weight |
|---|---|
| solution polymer from Example 1, Step II | 7.6 |
| Cymel 301[(1)] | 7.0 |
| titanium dioxide | 17.4 |
| isopropanol | 2.8 |
| n-butanol | 3.5 |
| latex from Example 28, Step II (emulsion polymer pluls stabilizer polymer I) | 51.3 |
| 10% aqeuous 2-(dimethylamino) ethanol | 10.4 |

[(1)]defined in Example 25.

The enamel when adjusted by water to a viscosity of 20 seconds (Ford Cup No. 4) is sprayed in a conventional manner upon primed steel panels and baked for 30 minutes. The initial baking temperature is 80°C. This temperature is gradually raised to 180°C and held there for at least 10 of the 30 minutes.

EXAMPLE 32

Step I Preparation of Latex

A latex is prepared according to the procedures of Step II of Example 28 using the following mixture of reactant monomers and chain transfer agent:

| Materials | Parts by Weight |
| --- | --- |
| styrene | 2.0 |
| hydroxypropylmethacrylate | 18.0 |
| acrylic acid | 2.0 |
| butyl acrylate | 50.0 |
| butyl methacrylate | 10.0 |
| 1-octanethiol | 0.6 |

(1)defined in Example 25.

Step II Preparation of Enamel

There is prepared a surfactant-free, solvent-free, hybrid water-based enamel. The procedures used are those of Step IV of Example 28, but with the following materials:

| Materials | Parts by Weight |
| --- | --- |
| solution polymer from Step III of Example 28 | 15.2 |
| Cymel 300(1) | 6.9 |
| titanium dioxide | 17.3 |
| Water | 5.5 |
| latex from Step I of this Example | 50.9 |
| 10% aqueous 2-(dimethylamino)ethanol | 4.2 |

(1)defined in Example 1.

This enamel is sprayed on primed steel panels and baked for 25 minutes at 160°C.

EXAMPLE 33

Step I Preparation of Latex

A latex is prepared in the following manner:

1. There is charged to a reactor 127 parts of water and 2.57 parts of stabilizer polymer prepared as in Example 28.
2. The following reactant monomers and chain transfer agents are thoroughly mixed.

| Materials | Parts by Weight |
| --- | --- |
| styrene | 20.0 |
| hydroxypropylmethacrylate | 18.0 |
| acrylic acid | 2.0 |
| butyl acrylate | 50.0 |
| butyl methacrylate | 10.0 |
| 1-octanethiol | 0.6 |

3. There is dissolved 0.5 parts of ammonium persulfate and one part of 2-acrylamido-2-methylpropane sulfonic acid in 16.7 parts of water.
4. There is dissolved 0.1 parts of ammonium persulfate in 4.17 parts of water.

The procedures of Example 29 are repeated using the materials above listed to prepare the latex.

Step II Formulation of Coating Material

The procedures of Step IV of Example 28 are repeated substituting the latex prepared in Step I of this example for the latex prepared in Step II of Example 28.

EXAMPLE 34

The procedures of Example 33 are repeated with the difference that the latex (let down) is prepared as follows:

1. There is charged to a reactor 127 parts of water and 2.84 parts of stabilizer polymer prepared from the materials and according to the procedures used in Example 28.
2. The following reactant monomers and chain transfer agent are thoroughly mixed.

| Materials | Parts by Weight |
| --- | --- |
| styrene | 20.0 |
| methacrylic acid | 15.0 |
| butyl acrylate | 55.0 |
| butyl methacrylate | 10.0 |
| 1-octanethiol | 0.6 |

3. There is dissolved 0.4 parts of ammonium persulfate and 1.0 parts of 2-acrylamide-2-methylpropane sulfonic acid in 16.7 parts of water.
4. There is dissolved 0.1 parts of ammonium persulfate in 4.17 parts of water.

The latex is then prepared from the above materials using the procedures of Step II of Example 28.

EXAMPLE 35

A water-based enamel is produced in the following manner:

Step I Preparation of (let down) latex

1. There is charged to a reactor 128 parts of water and 2.67 parts of stabilizer polymer prepared from the materials and using the procedures of Step I of Example 28.
2. The following reactant monomers and chain transfer agent are thoroughly mixed.

| Materials | Parts by Weight |
| --- | --- |
| styrene | 20.0 |
| hydroxypropylmethacrylate | 18.0 |
| acrylic acid | 2.0 |
| butyl acrylate | 25.0 |
| butyl methacrylate | 35.0 |
| 1-octanethiol | 0.6 |

3. There is dissolved 0.5 parts of ammonium persulfate and 1.0 parts of 2-acrylamide-2-methylpropane sulfonic acid in 16.7 parts of water.
4. There is dissolved 0.1 parts of ammonium persulfate in 4.17 parts of water.

The latex is prepared using the above materials and the procedures of Step II of Example 28.

Step II Preparation of the Solution Polymer

1. There is charged to a reactor 200 parts of water and 4 parts of stabilizer polymer prepared from the same materials and procedures used to prepare the stabilizer polymer in Example 28.
2. The following reactant monomers and chain transfer agent are thoroughly mixed.

| Materials | Parts by Weight |
| --- | --- |
| methyl methacrylate | 35 |
| methacrylic acid | 15 |
| butyl acrylate | 50 |
| 1-octanethiol | 1 |

The solution polymer is then prepared from the above materials using the procedures used in Step II of Example 28.

The latex so obtained is neutralized with 2-(dimethylamino) ethanol to an amount equivalent to the methacrylic acid constituent of the polymer.

Step III Formulation of Coating Material

A coating formulation is prepared from the following materials:

| Materials | Parts by Weight |
|---|---|
| solution polymer from the Example Step II | 17.5 |
| Cymel 301[1] | 8.7 |
| titanium dioxide | 19.8 |
| Water | 7.9 |
| latex from this Example Step I | 43.5 |
| 20% aqueous 2-(dimethylamine)ethanol | 2.4 |

[1]defined in Example 25.

The coating material is formed from the above materials using the procedures of Step IV of Example 28. The resultant enamel adjusted to a viscosity of 20 seconds (Ford Cup No. 4) is sprayed on primed steel panels and baked for 25 minutes. The initial baking temperature is 100°C. This temperature is gradually raised to 180°C and maintained at 180°C for at least 10 of the 25 minutes. The resultant coatings demonstrate good gloss and physical properties. The resistance of these coatings to soaking in water at 32°C for 240 hours is excellent.

EXAMPLE 36

A water-based enamel is produced in the following manner:

Step I Preparation of (let down) Latex

1. There is charged to a reactor 127 parts of water and 2 parts of stabilizer polymer prepared from the materials and using the procedures used to prepare the stabilizer polymer of Example 28.

2. The following reactant monomers and chain transfer agent are thoroughly mixed.

| Materials | Parts by Weight |
|---|---|
| styrene | 20.0 |
| hydroxypropylmethacrylate | 14.0 |
| methacrylic acid | 6.0 |
| butyl acrylate | 25.0 |
| butyl methacrylate | 35.0 |
| 1-octanethiol | 0.7 |

3. There is dissolved 0.5 parts of ammonium persulfate in 16.7 parts of water.

4. There is dissolved 0.1 parts of ammonium persulfate in 4.66 parts of water.

The latex is prepared from the above materials following the procedures of Step II of Example 28.

The resultant latex polymer, i.e., the emulsion polymer, has average molecular weight ($\overline{M}_n$) of about 8,500 and a Tg of 20°C.

Step II Formulation of Coating Material

A coating material is prepared from the following materials:

| Materials | Parts by Weight |
|---|---|
| solution resin from Step II, Example 35 | 12.6 |
| Cymel 300[1] | 7.6 |
| titanium dioxide | 21.0 |
| latex from Step I of this Example (includes emulsion polymer and stabilizer polymer) | 46.2 |
| 10% aqueous 2-(dimethylamino)ethanol | 4.2 |
| Water | 8.4 |

The coating formulation is prepared from the above materials using the procedures of Step IV of Example 28.

EXAMPLE 37

The procedures of Example 28 are repeated with the difference that in preparing the soluble stabilizer polymer of Step I there is used with the reactant monomers 3.5 parts by weight of 1-octanethiol. The average molecular weight ($\overline{M}_n$) of the resultant stabilizer polymer is about 3,000. It has a Tg of about −8°C.

EXAMPLE 38

The procedures of Example 28 are repeated with the difference that in preparing the soluble stabilizer polymer of Step I there is used with the reactant monomers 0.5 parts by weight of 1-octanethiol. The average molecular weight ($\overline{M}_n$) of the resultant stabilizer polymer is about 10,000. It has a Tg of about −8°C.

EXAMPLE 39

The procedures of Example 28 are repeated with the difference that in preparing the soluble stabilizer polymer of Step I the following reactant monomers and chain transfer agent are used:

| Materials | Parts by Weight |
|---|---|
| methacrylic acid | 15 |
| methyl methacrylate | 30 |
| styrene | 5 |
| butyl acrylate | 40 |
| butyl methacrylate | 10 |
| 1-octanethiol | 2 |

The average molecular weight ($\overline{M}_n$) of the resultant soluble stabilizer polymer is about 4,000. Its Tg is about 18°C.

EXAMPLE 40

The procedures of Examples 1 and 28 are repeated with the single difference that in lieu of the commercially available amino resin (Cymel 300) crosslinking agent there is used a chemically equivalent amount of melamine resin prepared from the following materials and in the following manner:

Water (400 parts by weight), sodium hydroxide (3.5 parts by weight), and paraformaldehyde (326 parts by weight) are heated to reflux and refluxed 15 minutes. The solution is cooled to 85°C, and the pH is adjusted to 8.5 with aqueous sodium hydroxide. Melamine (126 parts) is added, and the mixture is maintained at 80°–90°C for 10 minutes. Methanol (992 parts) and concentrated sulfuric acid (36 parts) are added and the mixture is stirred for about 1 hour. Upon addition of 320 parts 25 percent aqueous sodium hydroxide, a white precipitate is formed which is removed by filtration. Approximately 300 parts of a semi-solid methylated melamine are isolated from the filtrate by vacuum distillation and used in the formulation of water-based enamels.

EXAMPLE 41

The procedures of Examples 1 and 28 are repeated with the single difference that in lieu of the commercially available amino resin (Cymel 300) crosslinking agent there is used a chemically equivalent amount of a urea-formaldehyde resin prepared from the following materials and in the following manner:

Preparation of Urea-Formaldehyde Resin

In a one liter three-necked flask equipped with reflux condenser, thermometer, and stirrer are placed 243 g. of 37 percent aqueous formaldehyde and 4-6 g. of concentrated ammonium hydroxide to bring the pH to 7.5-8.5. Sixty g. urea is added with stirring and the mixture heated to 100°C over a 1 -hour period by means of a heating mantle. This temperature is maintained 10 and ½ hours. 64 g. methanol is added, followed by enough phosphoric acid to bring the pH to 5.5. The reaction is stirred for 1 hour. Water can be removed by heating 60°-70°C under a water aspirator pressure of 100-200 mm. The resin can be dissolved in isopropyl alcohol to give a 60 percent solution. The term "parts" when used herein without further designation shall mean "parts by weight."

The term "acrylic monomer" shall mean acrylic acid, methacrylic acid, esters of acrylic acid and a $C_1-C_8$ monohydric alcohol, e.g., ethyl acrylate, butyl acrylate, hexyl acrylate and 2-ethylhexyl acrylate, esters of methacrylic acid and a $C_1 - C_8$ monohydric alcohol, e.g., methyl methacrylate, butyl methacrylate, hexyl methylacrylate and 2-ethylhexyl methacrylate, hydroxyalkyl acrylates, e.g., hydroxyethyl acrylate and hydroxypropyl acrylate, hydroxyalkyl methacrylates, e.g., hydroxyethyl methacrylate and hydroxypropyl methacrylate, acrylamide, methacrylamide, methylolacrylamides, e.g., n-methylolacrylamide, methylolmethacrylamides, e.g., N-methylolmethacrylamide, alkyl ethers of methylolacrylamides, e.g., N-isobutoxymethylolacrylamide, and alkyl ethers of methylolmethacrylamides, e.g., N-isobutoxymethylolmethacrylamide.

The term "copolymer of acrylic monomers" shall mean a polymer of at least two different monoethylenically unsaturated monomers of which more than 50 mole percent are acrylic monomers.

The term "water-dilutable organic solvent" means an organic solvent or mixture of organic solvents which is either miscible with water or will mix with water up to a concentration of at least one volume of solvent per three volumes of water without phase separation. Ordinarily, such solvent, when present in the paint, enters the paint through its use in the preparation of the solution resin, as hereinbefore described. In such embodiment, the solution polymer is, of course, soluble therein. In another embodiment, it may be added independently, if desired. In the latter case, the solution polymer may not be fully soluble therein.

While there have been described herein what are at present considered preferred embodiments of the invention it will be obvious to those skilled in the art that modifications and changes may be made in the exemplary embodiments without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

What is claim is:

1. In an aqueous dispersion of paint in which a carboxy-functional polymer is at least partially neutralized with a water-soluble amine and dispersed with an amino resin crosslinking agent selected from melamine-formaldehyde resins and urea-formaldehyde resins in an aqueous solution of water and a water-soluble amine, the improvement wherein the film-forming components of said dispersion of paint exclusive of said amino resin comprises the combination of:

I. about 5 to about 50 parts by weight of a solution polymer which is a carboxy-functional copolymer of acrylic monomers that:
      A. is at least partially neutralized with said water-soluble amine.
      B. is soluble in said aqueous solution,
      C. has average molecular weight ($\overline{M}_n$) in the range of about 3,000 to about 20,000 and
      D. has Tg in the range of −15°C. to 50°C., and
   II. about 50 to about 95 parts by weight of an emulsion polymer having functionality selected from carboxy functionality and hydroxy functionality and is a copolymer of acrylic monomers that:
      A. is essentially insoluble in said aqueous solution,
      B. has average molecular weight ($\overline{M}_n$) in the range of about 3,000 to about 20, 000, and
      C. has Tg in the range of −15°C. to 50°C., and wherein said amino resin crosslinking agent is present in an amount in the range of about 15 to about 35 weight percent of the sum of the weights of said solution polymer and said emulsion polymer.

2. An aqueous dispersion of paint in accordance with claim 1 adapted for spray paint application by adjusting the water content thereof to between about 50 and about 65 weight percent of said dispersion and adjusting the pH to between 7 and 10.

3. An aqueous dispersion of paint in accordance with claim 2 wherein about 5 to about 20 volume percent of the water in said dispersion is displaced by an equal volume of an essentially non-ionizable organic solvent for said solution resin.

4. An aqueous dispersion of paint in accordance with claim 3 wherein said organic solvent is an alcohol.

5. An aqueous dispersion of paint in accordance with claim 1 wherein in addition to said solution polymer and said emulsion polymer, said paint dispersion contains a stabilizer polymer which is a carboxy-functional acrylic copolymer that is soluble in said aqueous solution, has average molecular weight ($\overline{M}_n$) below that of said solution polymer and is present in said aqueous dispersion in an amount in the range of about 0.01 to about 10 parts by weight.

6. An aqueous dispersion of paint in accordance with claim 1 wherein in addition to said solution polymer and said emulsion polymer, said paint dispersion contains a stabilizer polymer which is a carboxy-functional copolymer of acrylic monomers that is soluble in said aqueous solution, has average molecular weight ($\overline{M}_n$) in the range of about 3,000 to about 8,000, and is present in said aqueous dispersion in an amount in the range of about 0.025 to about 5 parts by weight.

7. In an aqueous dispersion of paint in which a carboxyfunctional polymer is at least partially neutralized with a water-soluble amine and dispersed with an amino resin crosslinking agent selected from melamine-formaldehyde resins and urea-formaldehyde resins in an aqueous solution of water and a water-soluble amine, the improvement wherein the filmforming components of said dispersion of paint exclusive of said amino resin consist essentially of:

I. about 10 to about 30 parts by weight of a solution polymer which is a carboxy-functional copolymer of acrylic monomers that:
   A. is at least partially neutralized with said water soluble amine,
   B. is soluble in said aqueous solution,
   C. has average molecular weight ($\overline{M}_n$) in the range of about 3,000 to about 20,000, and
   D. has Tg in the range of −15°C. to 50°C.,
II. about 70 to about 90 parts by weight of an emulsion polymer having functionality selected from carboxy functionality and hydroxy functionality and is a copolymer of acrylic monomers that:
   A. is essentially insoluble in said aqueous solution,
   B. has average molecular weight ($\overline{M}_n$) in the range of about 3,000 to about 20,000, and
   C. has Tg in the range of −15°C., to 50°C., and
said amino resin crosslinking agent is present in an amount in the range of about 15 to about 35 weight percent of the sum of the weights of said solution polymer and said emulsion polymer.

8. An aqueous dispersion of paint in accordance with claim 7 having pH in the range of 7 to about 10.

9. An aqueous dispersion of the paint in accordance with claim 7 having pH in the range of 7 to about 9.5.

10. An aqueous dispersion of paint in accordance with claim 7 having pH in the range of 7 to about 9.9.

11. An aqueous dispersion of paint in accordance with claim 7 wherein said solution polymer in addition to being carboxy-functional is also hydroxy-functional.

12. An aqueous dispersion of paint in accordance with claim 7 wherein said solution polymer in addition to being carboxy-functional is also amide-functional.

13. In a method for producing an aqueous dispersion of paint in which a carboxy-functional polymer is at least partially neutralized with a water-soluble amine and dispersed with an amino resin crosslinking agent selected from melamineformaldehyde resins and urea-formaldehyde resins in a continuous phase consisting essentially of water-dilutable organic solvent and an aqueous solution of water and water-soluble amine, the improvement which comprises intimately dispersing with said water, said amine resin crosslinking agent and said water-soluble amine:

I. about 5 to about 50 parts by weight of a solution polymer which is a carboxy-functional copolymer of acrylic monomers that:
   A. is at least partially neutralized with water-soluble amine,
   B. is soluble in said aqueous solution,
   C. has average molecular weight ($\overline{M}_n$) in the range of about 3,000 to about 20,000, and
   D. has Tg in the range of −15°C., to 50°C., and
II. An aqueous emulsion consisting essentially of water, water-soluble amine, and about 50 to about 95 parts by weight of an emulsion polymer having functionality selected from carboxy functionality and hydroxy functionality and is a copolymer or acrylic monomers that:
   A. is essentially insoluble in said aqueous solution,
   B. has average molecular weight ($\overline{M}_n$) in the range of about 3,000 to about 20,000, and
   C. has Tg in the range of −15°C. to 50°C.,
said amino resin crosslinking agent being present in an amount in the range of about 15 to about 35 weight percent of the sum of the weights of said solution polymer and said emulsion polymer and said water-dilutable organic solvent constituting between 5 and 20 percent of said continuous phase when the combination of said water and said water-dilutable organic solvent comprises 50 to 65 weight percent of said aqueous dispersion.

* * * * *